United States Patent
Dilts (10) Patent No.: US 11,202,406 B2
(45) Date of Patent: Dec. 21, 2021

(54) OPERATOR ADJUSTABLE CONTINUOUS BIN LEVEL MEASUREMENT

(71) Applicant: CNH Industrial America LLC, New Holland, PA (US)

(72) Inventor: Mark D. Dilts, New Holland, PA (US)

(73) Assignee: CNH Industrial America LLC, New Holland, PA (US)

(*) Notice: Subject to any disclaimer, the term of this patent is extended or adjusted under 35 U.S.C. 154(b) by 494 days.

(21) Appl. No.: 16/138,075

(22) Filed: Sep. 21, 2018

(65) Prior Publication Data

US 2019/0124838 A1 May 2, 2019

Related U.S. Application Data

(60) Provisional application No. 62/561,270, filed on Sep. 21, 2017.

(51) Int. Cl.
| | |
|---|---|
| *G06F 7/70* | (2006.01) |
| *G06F 19/00* | (2018.01) |
| *G06G 7/00* | (2006.01) |
| *G06G 7/76* | (2006.01) |
| *A01D 41/127* | (2006.01) |
| *G01F 23/00* | (2006.01) |
| *G06Q 50/02* | (2012.01) |

(52) U.S. Cl.
CPC ..... *A01D 41/1275* (2013.01); *A01D 41/1276* (2013.01); *G01F 23/0076* (2013.01); *G06Q 50/02* (2013.01)

(58) Field of Classification Search
CPC ............ A01D 41/1275; A01D 41/1276; A01D 41/1274; G01F 23/0076; G06Q 50/02
See application file for complete search history.

(56) References Cited

U.S. PATENT DOCUMENTS

| | | | | |
|---|---|---|---|---|
| 5,995,895 A | * | 11/1999 | Watt | ........................ A01D 75/28 |
| | | | | 701/50 |
| 7,877,181 B2 | | 1/2011 | Chervenka et al. | |

(Continued)

FOREIGN PATENT DOCUMENTS

| | | |
|---|---|---|
| EP | 2250871 A1 | 11/2010 |
| EP | 2944178 A1 | 11/2015 |

OTHER PUBLICATIONS

Extended European Search Report for EP Application 18194919.9 dated Feb. 15, 2019 (seven pages).

*Primary Examiner* — Harry Y Oh
*Assistant Examiner* — Sohana Tanju Khayer
(74) *Attorney, Agent, or Firm* — Peter Zacharias; Patrick Sheldrake (57) ABSTRACT

An embodiment includes a combine having a feeder housing for receiving harvested crop, a separating system for threshing the harvested crop to separate grain from residue, a grain bin for storing the separated grain, a bin level sensor for detecting grain in the grain bin; and a controller that controls the combine. The controller is configured to generate a usable operating range by discarding a selected range of values from an operating range of the bin level sensor, generate a shifted operating range by shifting the usable operating range by a shift value, receive a first value indicating a level of grain in the grain bin, generate a second value by shifting the first value by the shift value, and present the second value to an operator of the combine.

18 Claims, 12 Drawing Sheets

(56) References Cited

U.S. PATENT DOCUMENTS

| | | | |
|---|---|---|---|
| 9,043,096 B2 | 5/2015 | Zielke et al. | |
| 2006/0220331 A1* | 10/2006 | Schafer | B62D 57/024 |
| | | | 280/6.154 |
| 2009/0325658 A1* | 12/2009 | Phelan | G01F 23/0007 |
| | | | 460/6 |
| 2010/0285855 A1* | 11/2010 | Chervenka | A01D 41/1275 |
| | | | 460/119 |
| 2011/0213531 A1 | 9/2011 | Farley et al. | |
| 2014/0311113 A1* | 10/2014 | Bonefas | A01D 34/001 |
| | | | 56/10.2 R |
| 2016/0029559 A1* | 2/2016 | Inoue | A01D 41/1272 |
| | | | 56/10.2 G |
| 2017/0208742 A1* | 7/2017 | Ingibergsson | A01D 41/127 |

* cited by examiner

| REAL LEVEL | OPERATOR #1 SHIFT | NEW VALUES | OPERATOR #2 SHIFT | NEW VALUES |
|---|---|---|---|---|
| 100% | | | | |
| 99% | | | | |
| 98% | 2% | 100.0% | | |
| 97% | 2% | 99% | | |
| 96% | 2% | 98% | WHOLE BAND MOVES | WHOLE BAND MOVES |
| 91% | 2% | 93% | | |
| 90% | 2% | 92% | 10% | 100% |
| 89% | 2% | 91% | 10% | 99% |
| 25% | 2% | 27% | 10% | 35% |
| 24% | 2% | 26% | 10% | 34% |
| 23% | 2% | 25% | 10% | 33% |
| 22% | 2% | - | 10% | 32% |
| 15% | 2% | - | 10% | 25% |
| 14% | 2% | - | 10% | - |
| 1% | 2% | - | 10% | - |
| 0% | 2% | - | 10% | - |

OPERATOR ADJUSTABLE CONTINUOUS BIN LEVEL MEASUREMENT

FIELD

The invention relates to an operator adjustable bin level measurement system and method for implementation in a harvester combine.

BACKGROUND

Harvesters (e.g. combines) are used to harvest crops. Operations performed by these combines include chopping the crop and collecting grain in a grain bin. These conventional combines, however, utilize grain quantity measurement methods that are susceptible to grain measurement inaccuracies and grain spillage.

SUMMARY

An embodiment includes a combine having a feeder housing for receiving harvested crop, a separating system for threshing the harvested crop to separate grain from residue, a grain bin for storing the separated grain, a bin level sensor for detecting grain in the grain bin; and a controller that controls the combine. The controller is configured to generate a usable operating range by discarding a selected range of values from an operating range of the bin level sensor, generate a shifted operating range by shifting the usable operating range by a shift value, receive a first value indicating a level of grain in the grain bin, generate a second value by shifting the first value by the shift value, and present the second value to an operator of the combine.

Another embodiment includes method for controlling a combine having a chassis, a feeder housing for receiving harvested crop, a separating system for threshing the harvested crop to separate grain from residue, a grain bin for storing the separated grain, a bin level sensor for detecting grain in the grain bin, and a controller that controls the combine. The controller generating a usable operating range by discarding values from an operating range of the bin level sensor, generating a shifted operating range by shifting the usable operating range by a shift value, receiving a first value indicating a level of grain in the grain bin, generating a second value by shifting the first value by the shift value, and presenting the second value to an operator of the combine.

DETAILED DESCRIPTION

Aspects of the invention provide methods and systems for operator adjustable bin level measurement for implementation in a harvester combine.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
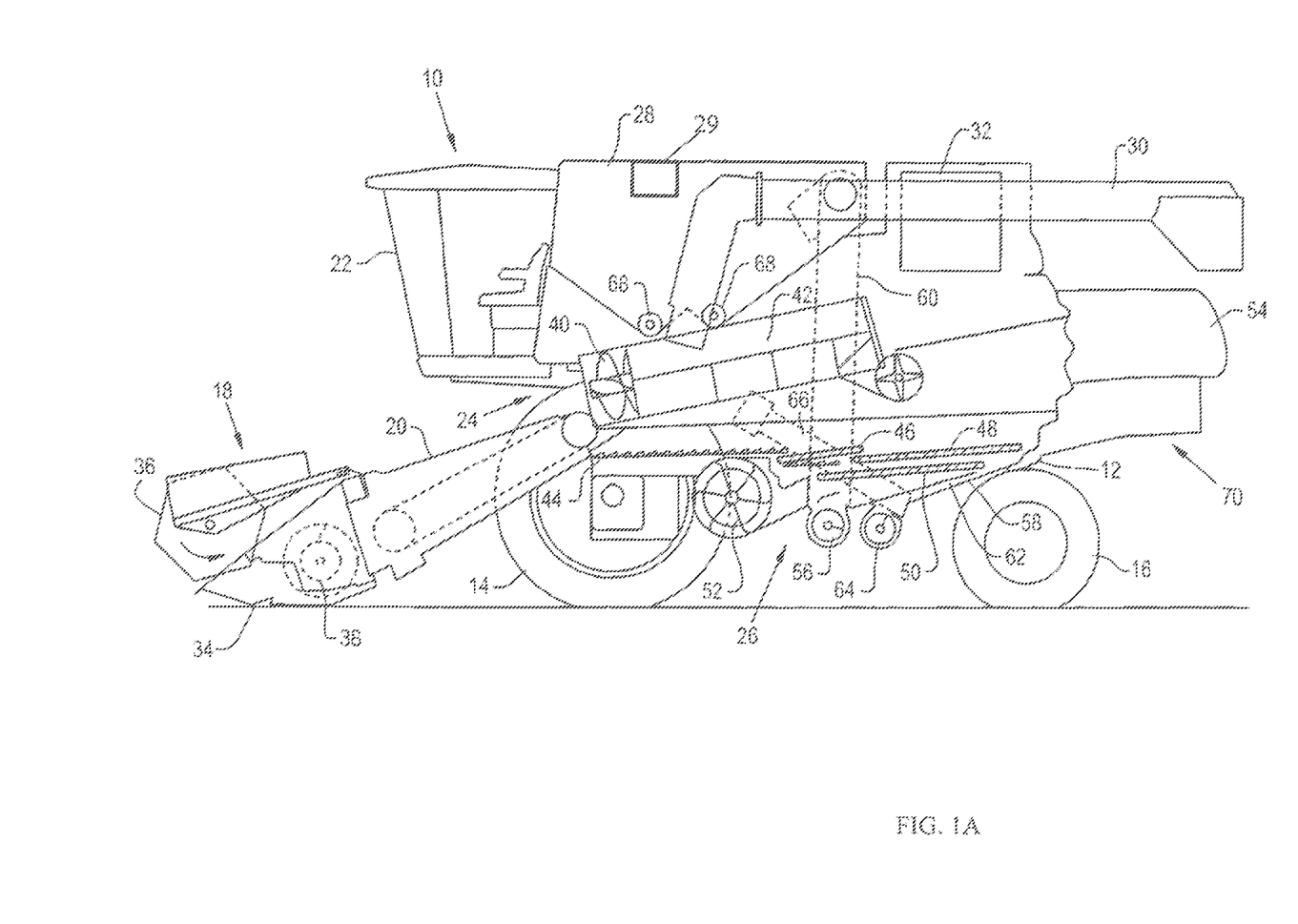
FIG. 1A is a side view of a combine, according to an embodiment of the invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain bin 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes at least one rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain bin 28.

The level of grain in grain bin 28 is measured by bin level sensor 29 positioned within grain bin 28. Bin level sensor 29 may be an acoustic sensor, radar sensor or the like that measures distance to the grain in the bin. Generally, bin level sensor 29 transmits a signal towards the bottom of grain bin 28 and receives a reflection signal from the grain. A controller uses the roundtrip travel time of the signal to compute the distance from the sensor to the pile of grain. The controller uses this distance to determine how much grain is in grain bin 28 at any given time. As the grain pile grows, the roundtrip travel time of the signal will decrease indicating that the grain is getting closer to the top of grain bin 28.

Tailings from cleaning system 26 fall to a tailings auger trough 62. The tailings are transported via tailings auger 64 and return auger 66 to the upstream end of cleaning system 26 for repeated cleaning action. A pair of grain bin augers 68 at the bottom of grain bin 28 convey the clean grain laterally within grain bin 28 to unloading auger 30 for discharge from combine 10.

The non-grain crop material proceeds through a residue handling system 70. Residue handling system 70 includes a chopper, counter knives, a windrow door and a residue spreader. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door.

Figure 1B:
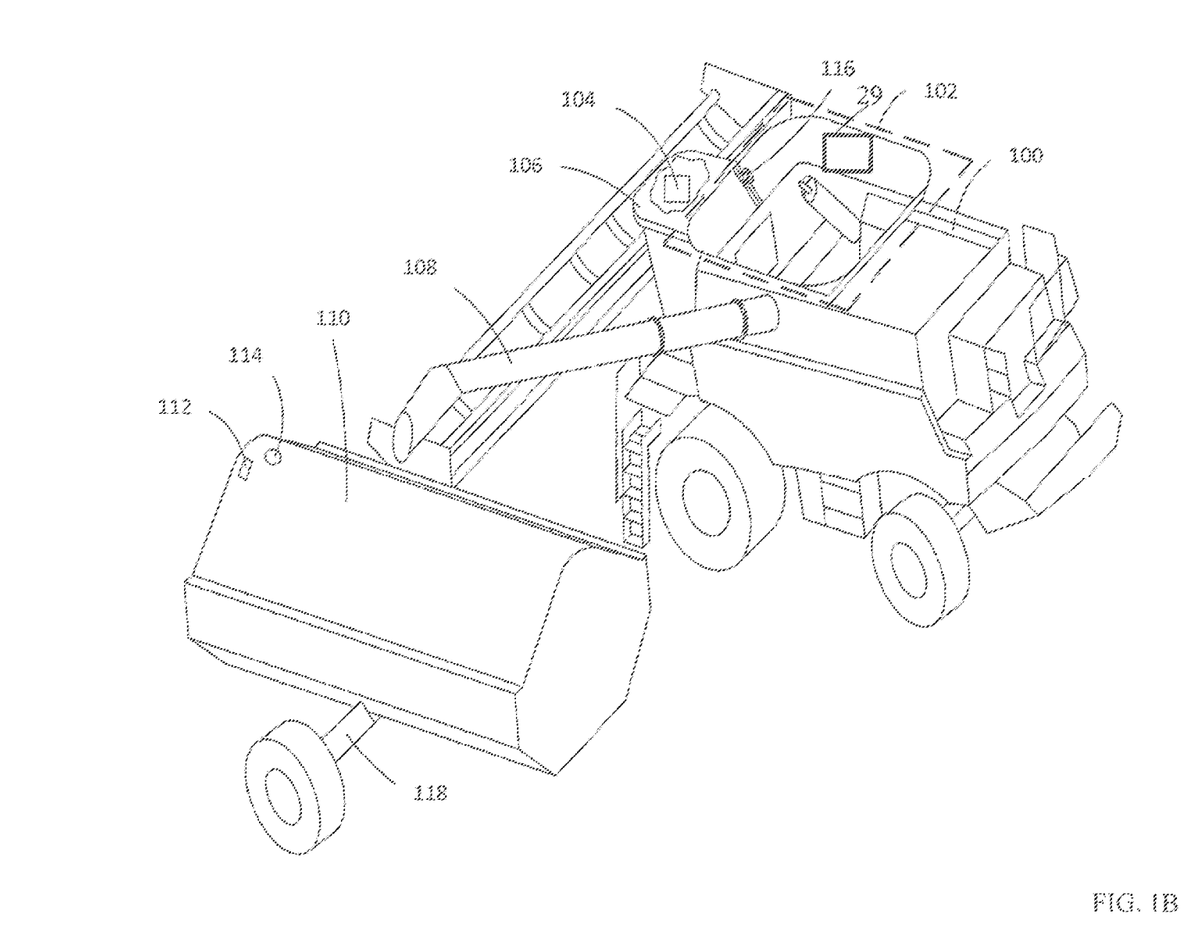
FIG. 1B is another view of a combine, according to an embodiment of the invention.

FIG. 1B illustrates a perspective view of a combine that utilizes a grain cart 110 for storing the harvested grain. As shown at FIG. 1B, combine 100 includes grain bin 102 for storing grain and unload tube 108 for carrying grain from grain bin 102 to grain cart 110 when bin level sensor 29 detects that the grain has reached a certain level. Combine 100 includes a controller 104 in cab 106 and transceiver 116. Grain cart 110 may also include a transceiver 114 for communicating with combine transceiver 116, bin level sensor 112 and load cell sensor 118. In some embodiments, exemplary controllers may be placed at different locations within the cab or other locations on the combine.

In the example of FIG. 1B, the level of grain in grain bin 102 is detected by bin level sensor 29, while the level of grain in grain cart 110 is detected by bin level sensor 112. The controller may control the combine to send grain from grain bin 102 to grain cart 110, and measure both levels to ensure that grain does not spill either from grain bin 102 or grain cart 110.

Figure 2A:
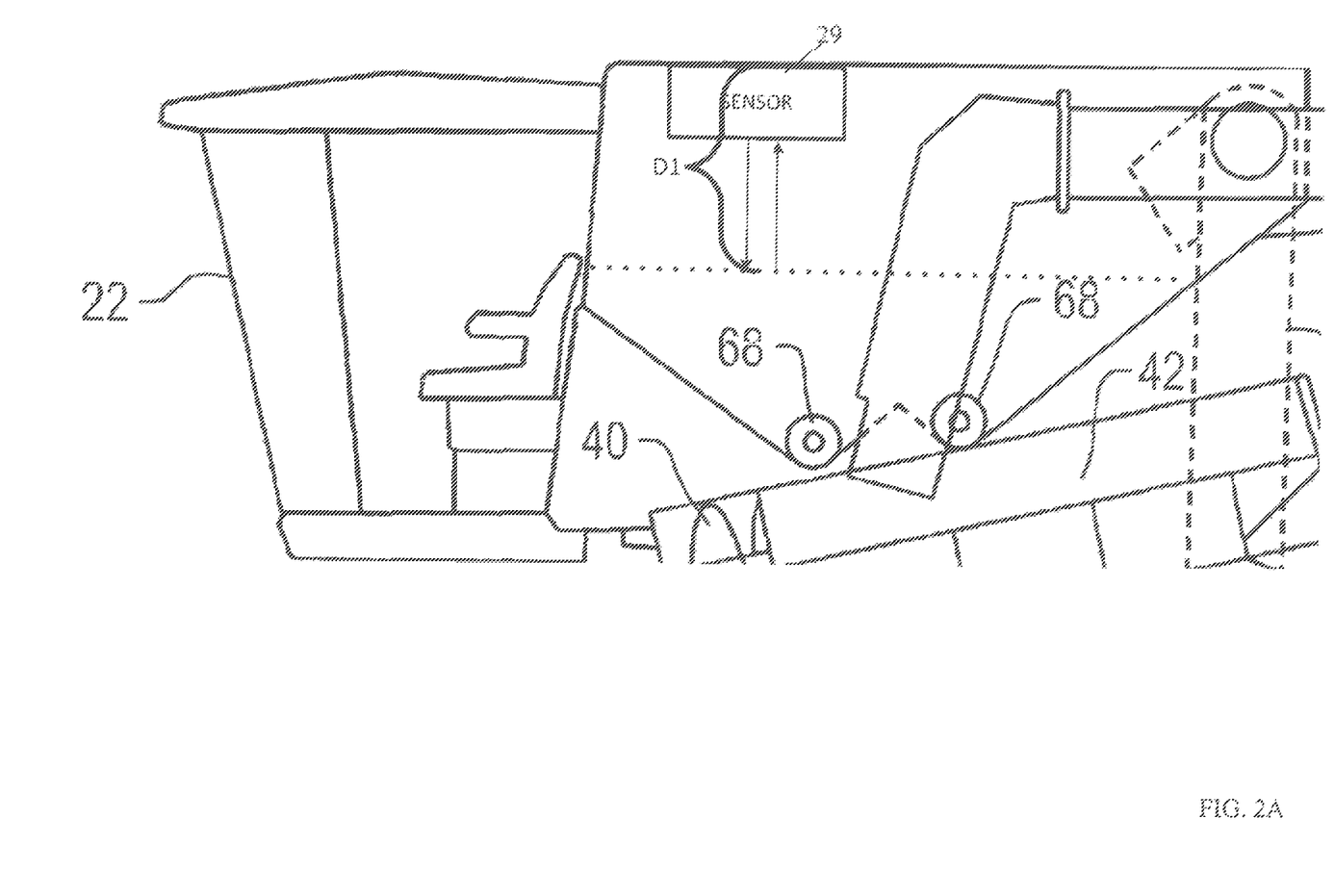
FIG. 2A is a close-up view of the grain bin on a combine with a level grain pile, according to an embodiment of the invention.

FIG. 2A shows a close-up view of grain bin 28 from FIG. 1A. During operation, grain is harvested and stored in grain bin 28. As shown by the dashed line in FIG. 2A, the grain pile is fairly uniform (e.g. level with respect to the top of the grain bin). In this example, bin level sensor 29 transmits a signal that is reflected by the pile of grain. The round trip time of this signal is then used along with the known velocity (e.g. speed of light for optical/radar sensors, or speed of sound for acoustic sensors) of the transmitted signal to determine a distance from bin level sensor 29 to the pile of grain. This distance correlates to distance D1 from the grain pile to the top opening of the grain bin.

In the example shown in FIG. 2A, the distance D1 is the accurate distance from the top (e.g. highest point) of the grain pile to the top opening of the grain bin so that the operator can determine if grain spillage might occur. If the grain is not near the top of grain bin 28, then the operator can continue harvesting grain. If, however, the grain is near the top of grain bin 28, then the operator would stop harvesting and unload the collected grain to avoid spillage.

The distance D1 from the bin level sensor to the grain pile, however, does not always directly correlate to the distance from the top of the grain pile to the top opening of the grain bin. In some scenarios (e.g. in sloped terrain), grain tends to move in the bin and pile in a non-uniform manner where the tallest portion of the grain pile is not oriented in the center of the grain bin under the sensor.

Figure 2B:
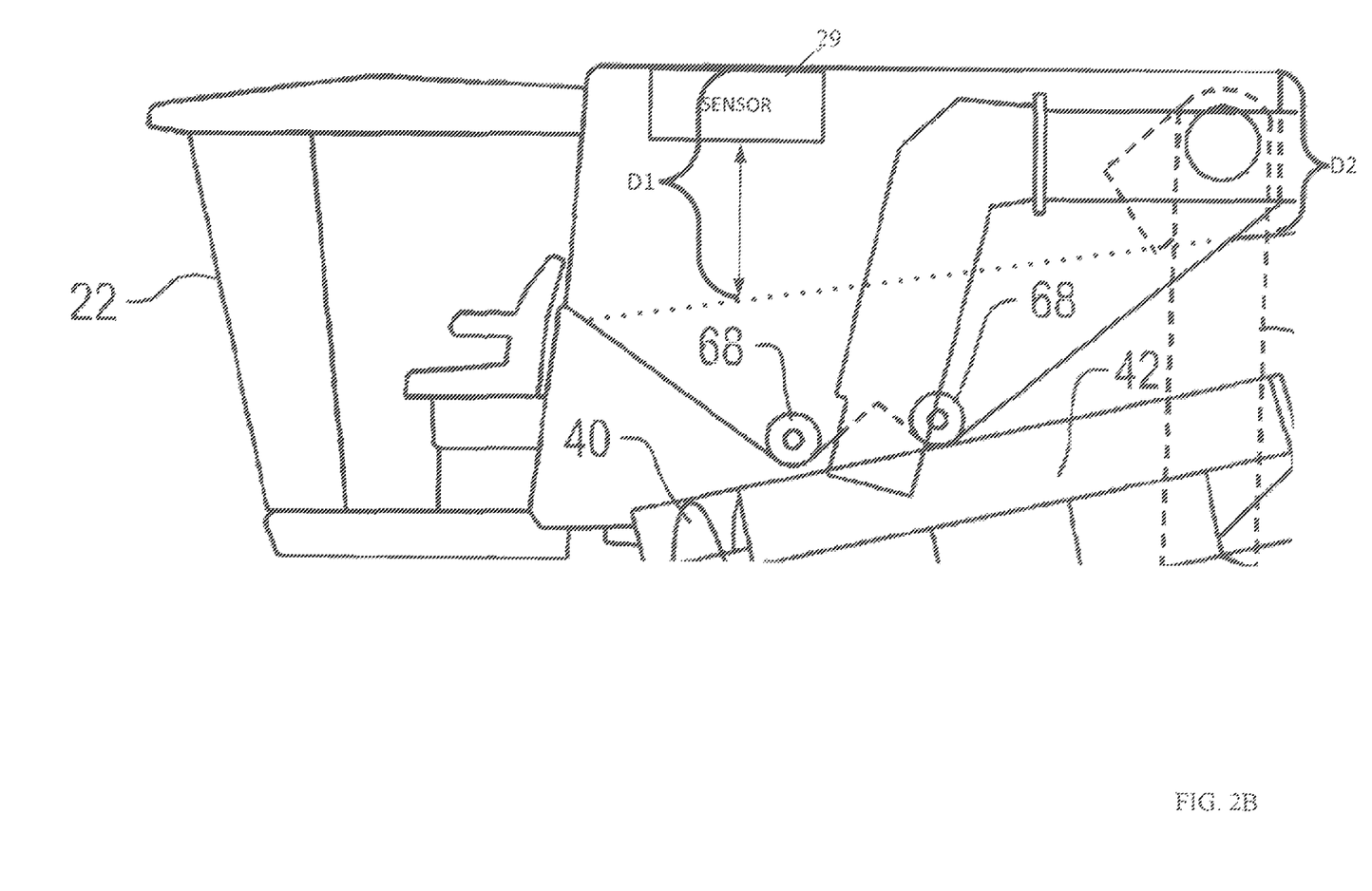
FIG. 2B is another close-up view of the grain bin on a combine with a slanted grain pile, according to an embodiment of the invention.

In one example, FIG. 2B shows a grain pile where the highest point of the pile is oriented towards the back portion of the grain bin. This may occur when the combine is traveling uphill during harvesting. In this example, the sensor may incorrectly determine that larger distance D1 is the distance from the top (e.g. highest point) of the grain pile to the top of the grain bin, when the actual distance is only D2 which is smaller than D1.

Figure 2C:
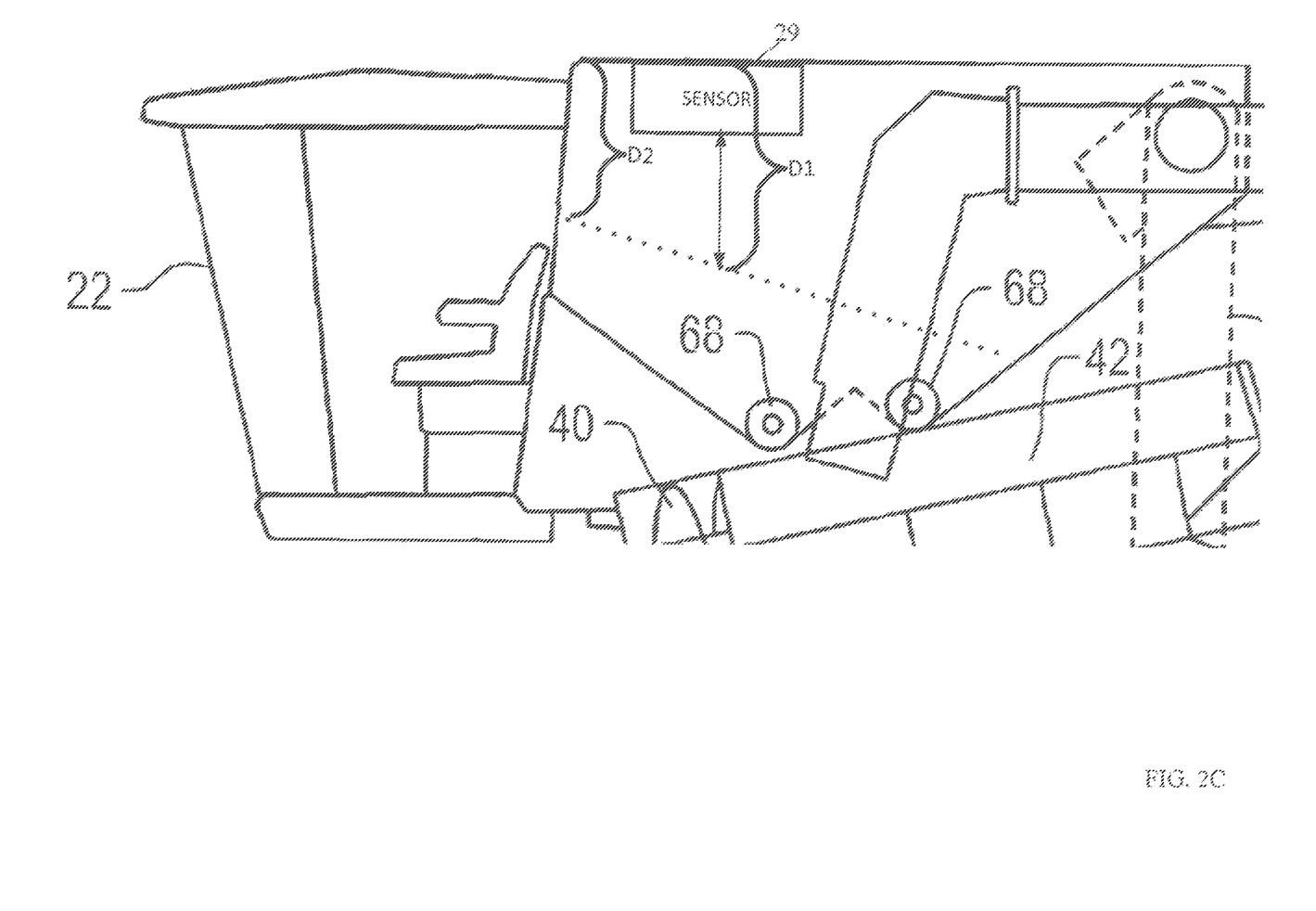
FIG. 2C is yet another close-up view of the grain bin on a combine with a slanted grain pile, according to an embodiment of the invention.

In another example, FIG. 2C shows a grain pile where the highest point of the pile is oriented towards the front portion of the grain bin. This may occur when the combine is traveling downhill during harvesting. In this example, the sensor may incorrectly determine that larger distance D1 is the distance from the top (e.g. highest point) of the grain pile to the top of the grain bin, when the actual distance is only D2 which is smaller than D1.

Although FIGS. 2B and 2C show examples where the grain pile is slanted towards the back and the front of the grain bin, the grain may be sloped in any direction within the grain bin, including to the sides and the corners of the bin. In addition, the slope of the grain may shift during operation of the combine on rough or non-flat terrain. When the grain is slanted as shown in FIGS. 2B and 2C, the sensor may incorrectly indicate the level of grain in the grain bin. This can lead to spillage of grain in certain circumstances. For example, if the sensor determines that the distance from the grain to the bin opening is D1 when it is actually D2, the operator may continue harvesting which may result in grain spillage (e.g. grain spills out of the top of the grain bin).

It is noted that although sensor 29 in FIGS. 2A-2C is mounted to the top center of the grain tank, other mounting positions are possible. For example, sensor 29 may be mounted on the upper rear wall of the grain tank. In this configuration, sensor 29 could be angled forward and downward towards the grain pile. The overall method for measuring the height of the grain pile would be similar to the method described in FIGS. 2A-2C.

In order to avoid such spillage, the combine of the present system shifts the operating range of the grain bin sensor to correlate the shifted values to the top of the grain bin. This shifted range is determined by taking various factors into account. These factors may include, but are not limited to terrain that the combine is traversing, speed of the combine, type of combine being operated, type of grain being harvested, or based on input from an experienced operator of the combine.

Determining the shifted range based on the various factors can be performed by a controller in the combine, or via a personal computer (PC) remote from the combine. This shifted range is then used by the combine controller to indicate to the operator a more accurate representation of the bin level.

Figure 3:
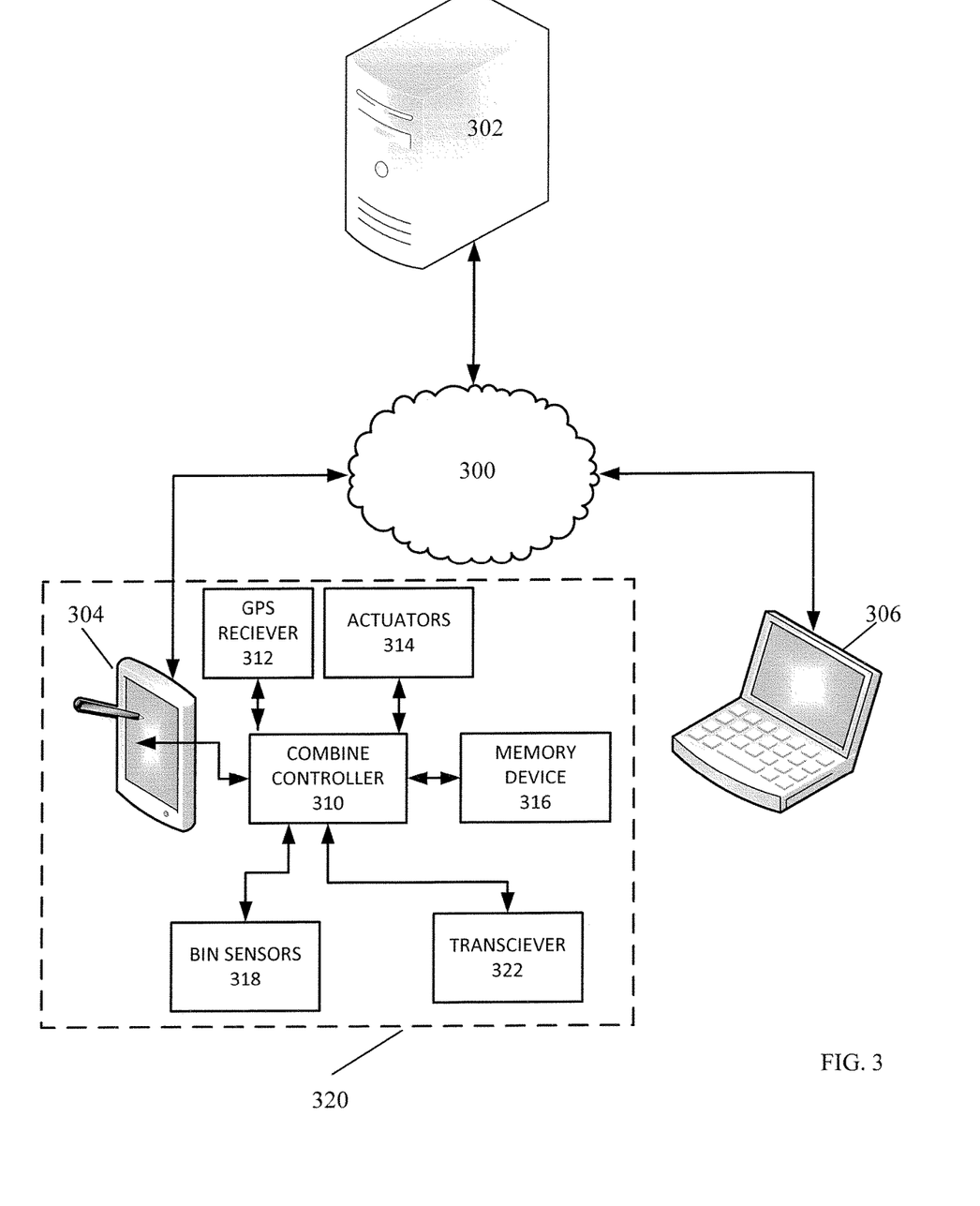
FIG. 3 is a view of the communication between the combine control system and an external network, according to an embodiment of the invention.

FIG. 3 shows an example of a system for controlling the combine. The system includes an interconnection between a control system 318 of combine 10, a remote PC 306 and a remote server 302 through network 300 (e.g. Internet). It should be noted that combine 10 does not have to be connected to other devices through a network. The controller of combine 10 can be a standalone system that receives operating instructions (e.g. bin level instructions such as alert levels, shifted operating ranges, etc.) through a user interface, or through a removable memory device (e.g. Flash Drive).

Prior to operating combine 10, an operator may designate the bin level alerts and other bin level related instructions (e.g. bin level alerts, shifted operating ranges, terrain, etc.). In one example, the operator uses interface 304 of the combine control system or PC 306 located at remote location 308. Interface 304 and PC 306 allow the operator to view locally stored parameters from memory device 316 and/or download parameters from server 302 through network 300. The operator may select (via Interface 304 or PC 306) appropriate bin level related instructions based on various factors including, among others, the type of crop to be harvested by the combine, and the terrain. Once the bin level related instructions are selected, the operator can begin harvesting. Combine controller 312 then controls actuators 314 (e.g. thresher, chopper, etc.) based on the instructions. For example, sensors 318 (e.g. bin level sensor) may be used during harvesting to compare the detected bin level to alert levels set by the operator based on terrain. When a specified level is reached, the alert output to the operator. Harvesting may also be tracked and aided by GPS receiver 312.

For example, if the terrain includes steep slopes, the operator may determine that 20% shift of the operating range is appropriate to avoid grain spillage. This shifted range is stored in a table in memory 316. During operation, the values detected by bin level sensor 318 are translated to these shifted operating range values. For example, if the bin level sensor detects a distance of 1 meter from the grain pile to the top of the grain bin, this value is shifted (e.g. reduced) by 20% to a value of 0.8 meters. The shifted value of 0.8 meters (not 1 meter) is then displayed to the operator. This number more accurately represents the level of grain in the bin due to sloping in the grain pile. For example, this shifted value more accurately represents the actual distance D2 as shown in FIGS. 2B and 2C.

Figure 4A:
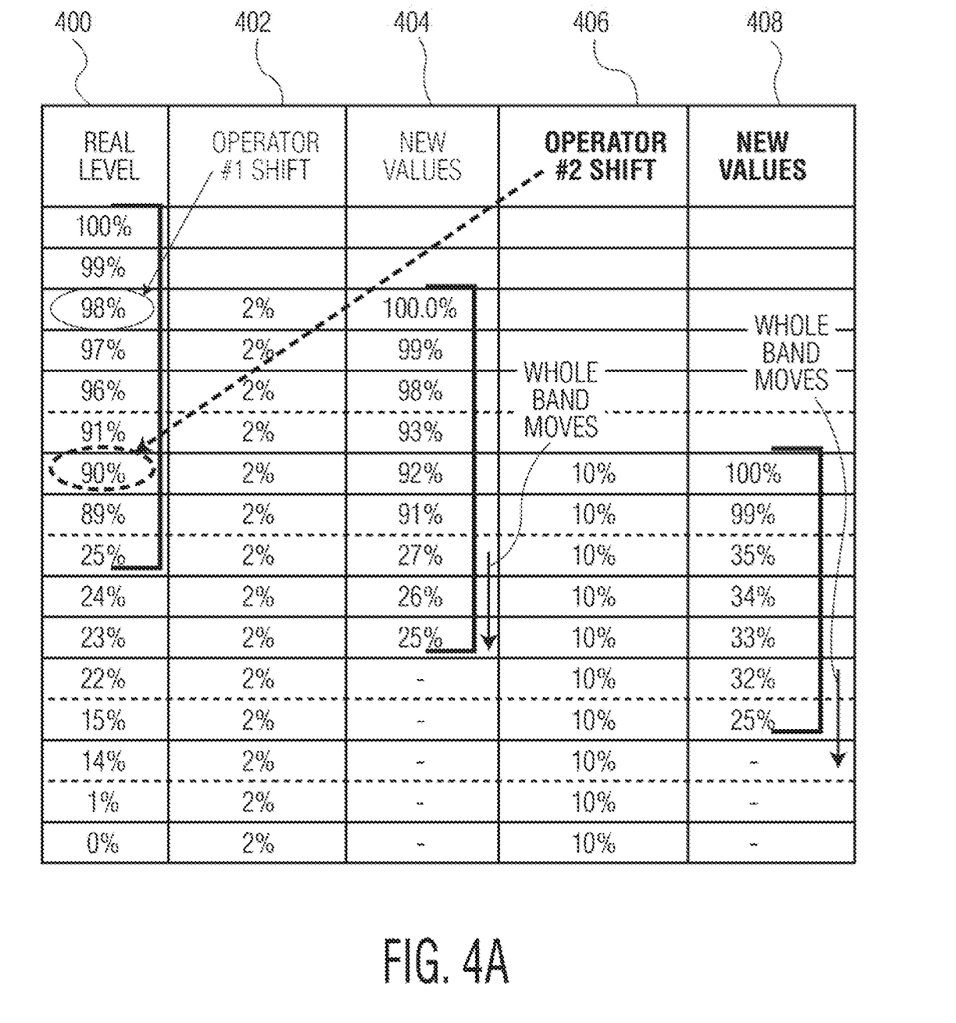
FIG. 4A is a view of shifting the operating range of the bin level sensor, according to an embodiment of the invention.

Shifting the operating range of the bin level sensor is shown in FIG. 4A. Column 400 shows the actual operating range of the sensor displayed to the operator as a percentage (e.g. 0% full bin to 100% full bin). As described above, however, the grain may spill from the bin before the sensor reads that the bin is 100% full. Thus, a shift may be applied. As shown in column 402, a 2% shift is chosen to avoid spillage. This may be chosen based on any number of factors including but not limited to terrain, and the type of crop being harvested. As shown in column 404, this effectively shifts the entire operating range of the sensor down by 2% such that when the sensor determines that the bin is 98% full, the system displays that the bin is 100% full to the operator. Of course, larger shifts are possible. For example, column 406 shows a chosen shift of 10%. As shown in column 408, this effectively shifts the entire operating range of the sensor down by 10% such that when the sensor determines that the bin is 90% full, the system displays that the bin is 100% full to the operator.

In general, the shift amount is selected to avoid spillage. However, the operator or the entity setting the shift value should minimize the shift value in order to efficiently use as much of the grain bin capacity as possible without creating spillage.

In addition to shifting the operating range of the sensor, the operating range can also be truncated. First, it is known that bin level sensors are not very accurate in the lower end of their operating range (e.g. when the bin is relatively empty). Second, the operator can typically see the level of grain in bin when it is relatively empty. Third, grain levels on the bottom of the range are not really important to the operator, as spillage cannot occur at such low levels, and harvesting is usually not terminated until higher levels of grain are collected.

Since this bottom range is not really needed, the system can truncate the bottom portion of the operating range and ignore it. For example, as shown in columns 400-408 of the table in FIG. 4A, the bottom portion (e.g. 0%-24%) of the shifted operating range of the sensor is truncated and ignored. When this truncation occurs, the combine may not display the level of grain in the grain bin until the bin level detected by the sensor reaches a minimum of 25%. It is noted that any number of values may be truncated from the bottom portion of the operating range. These values may be chosen based on any number of factors including but not limited to sensor accuracy, sensor positioning, etc.

Figure 4B:
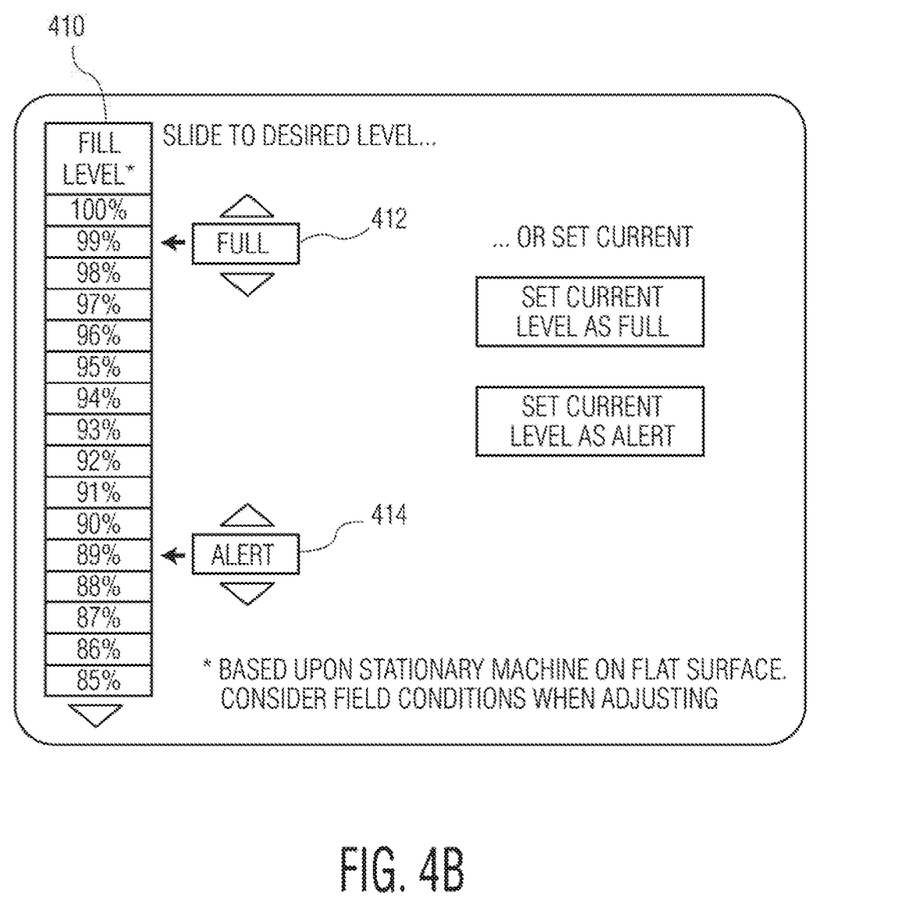
FIG. 4B is an example of a graphical user interface for controlling the shifting of the operating range of the bin level sensor based on percentage full, according to an embodiment of the invention.
Figure 4C:
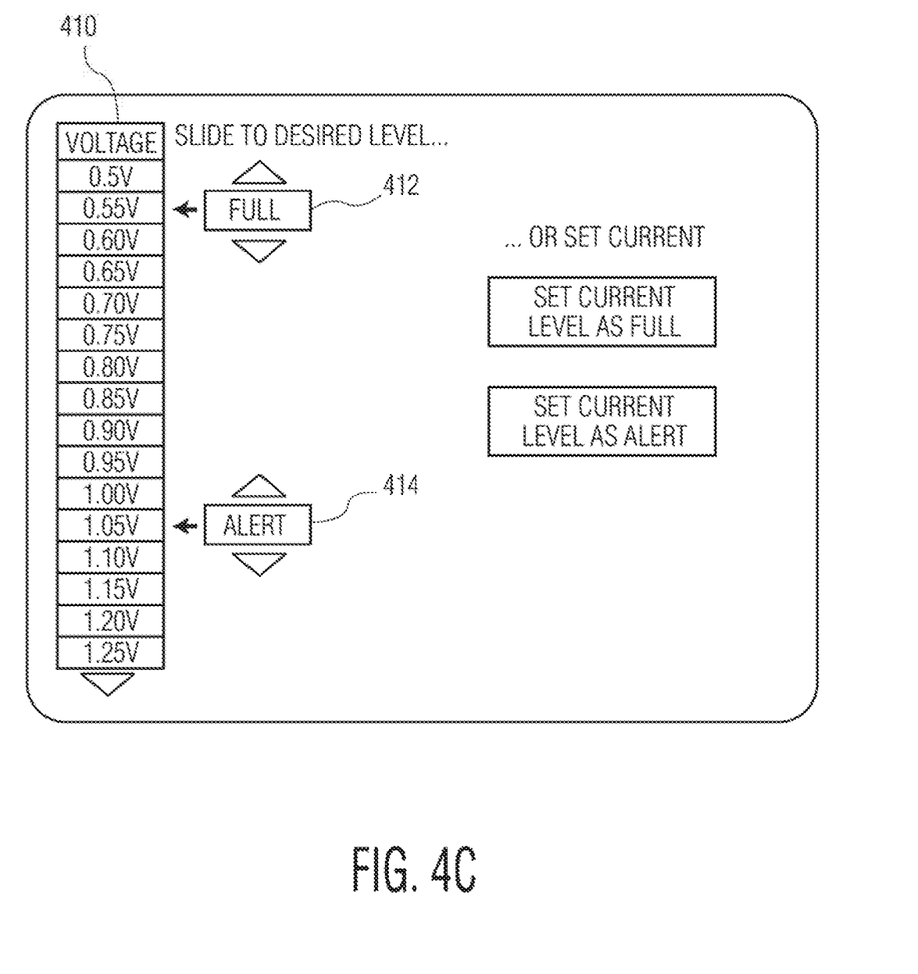
FIG. 4C is another example of a graphical user interface for controlling the shifting of the operating range of the bin level sensor based on voltage from the sensor, according to an embodiment of the invention.
Figure 4D:
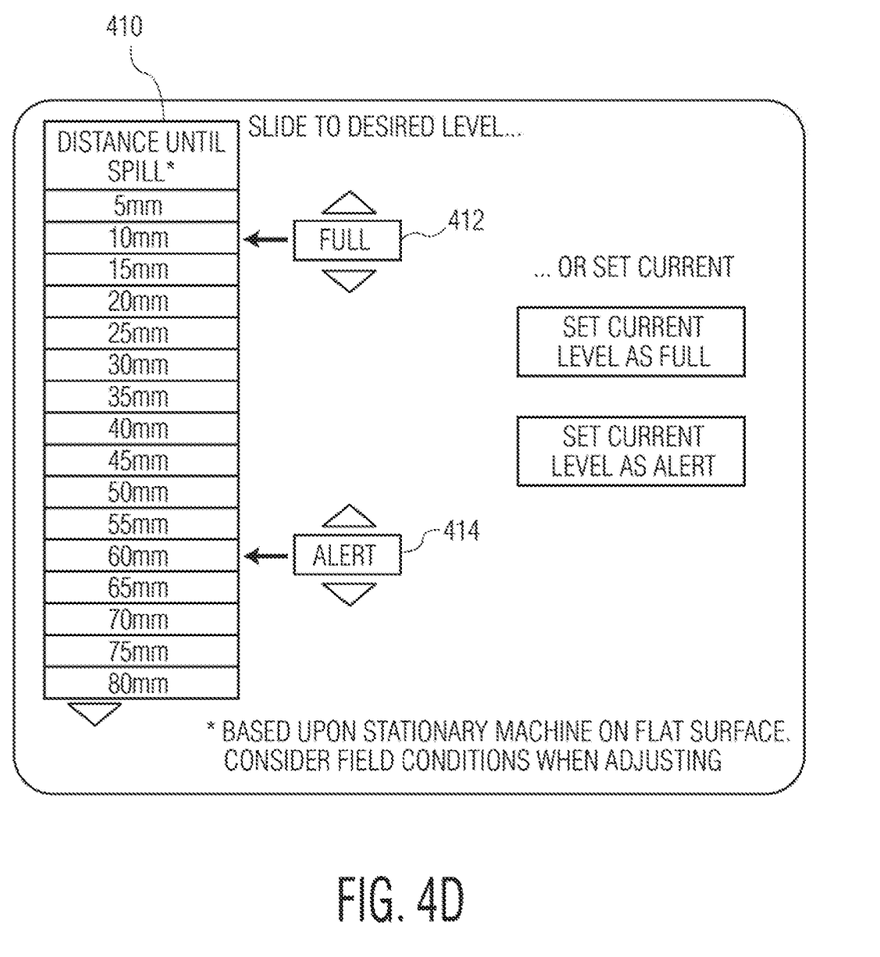
FIG. 4D is another example of a graphical user interface for controlling the shifting of the operating range of the bin level sensor based on distance until spill, according to an embodiment of the invention.
Figure 4E:
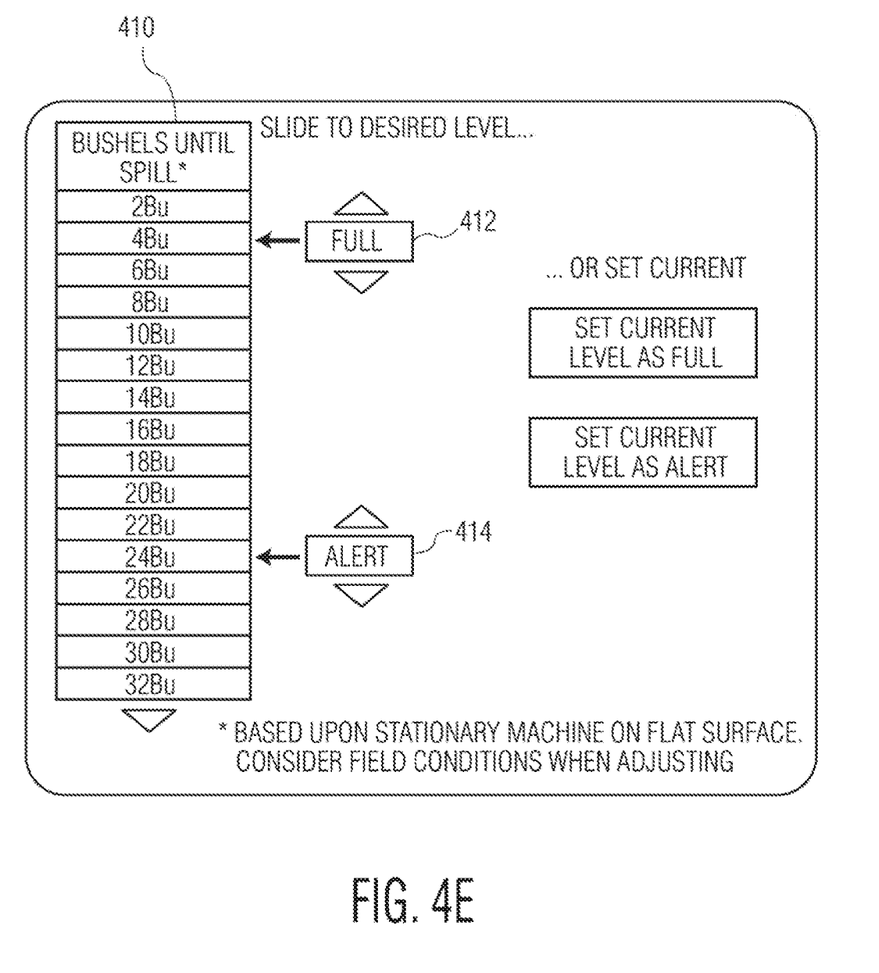
FIG. 4E is yet another example of a graphical user interface for controlling the shifting of the operating range of the bin level sensor based on the number of bushels until spill, according to an embodiment of the invention.

As described above, the range and current bin level within the range is displayed to the combine operator during harvesting. The range and current bin level may be displayed in a number of formats, including but not limited to the formats shown in FIGS. 4B-4E. In a first example, FIG. 4B shows the range and current bin level displayed as a fill level percentage 410 (e.g. percentage until spillage occurs). In a second example, FIG. 4C shows the range and current bin level displayed as a voltage level of the sensor 410 (e.g.

voltage until spillage occurs). In a third example, FIG. 4D shows the range and current bin level displayed a distance 410 (e.g. distance until spillage occurs). In yet a fourth example, FIG. 4E shows the range and current bin level displayed a volume 410 (e.g. number of bushels until spillage occurs).

In addition, FIGS. 4B-4E also show indicators such as a FULL indicator 412 that indicates when the grain bin is considered FULL, and an ALERT indicator 414 that indicates when the grain bin has reached an alert level. These indicators are adjustable by the operator or by any entity to set the desired values. For example, the operator may determine that a 1% shift in the sensor operating range is appropriate for a given harvesting job. The operator then slides the FULL indicator 412 to 99% indicating the 1% shift (see FIG. 4B). In addition, the operator may determine that they would like to receive an alert when the grain reaches within 10% of the FULL indicator 412. The operator then slides the ALERT indicator 414 to 89% which is 10% below the FULL indicator 412.

During operation, the current bin level is displayed in the range shown in FIG. 4B. For example, the current bin level may be highlighted in some manner by the controller. When the current bin level reaches 89%, an ALERT is issued. This alert may be an audible and/or visual alarm that lets the operator know that the bin is almost full. During this time, the operator may pay closer attention to the bin level so that it does not go above the FULL indicator 412. This process effectively avoids spillage of grain.

Figure 5:
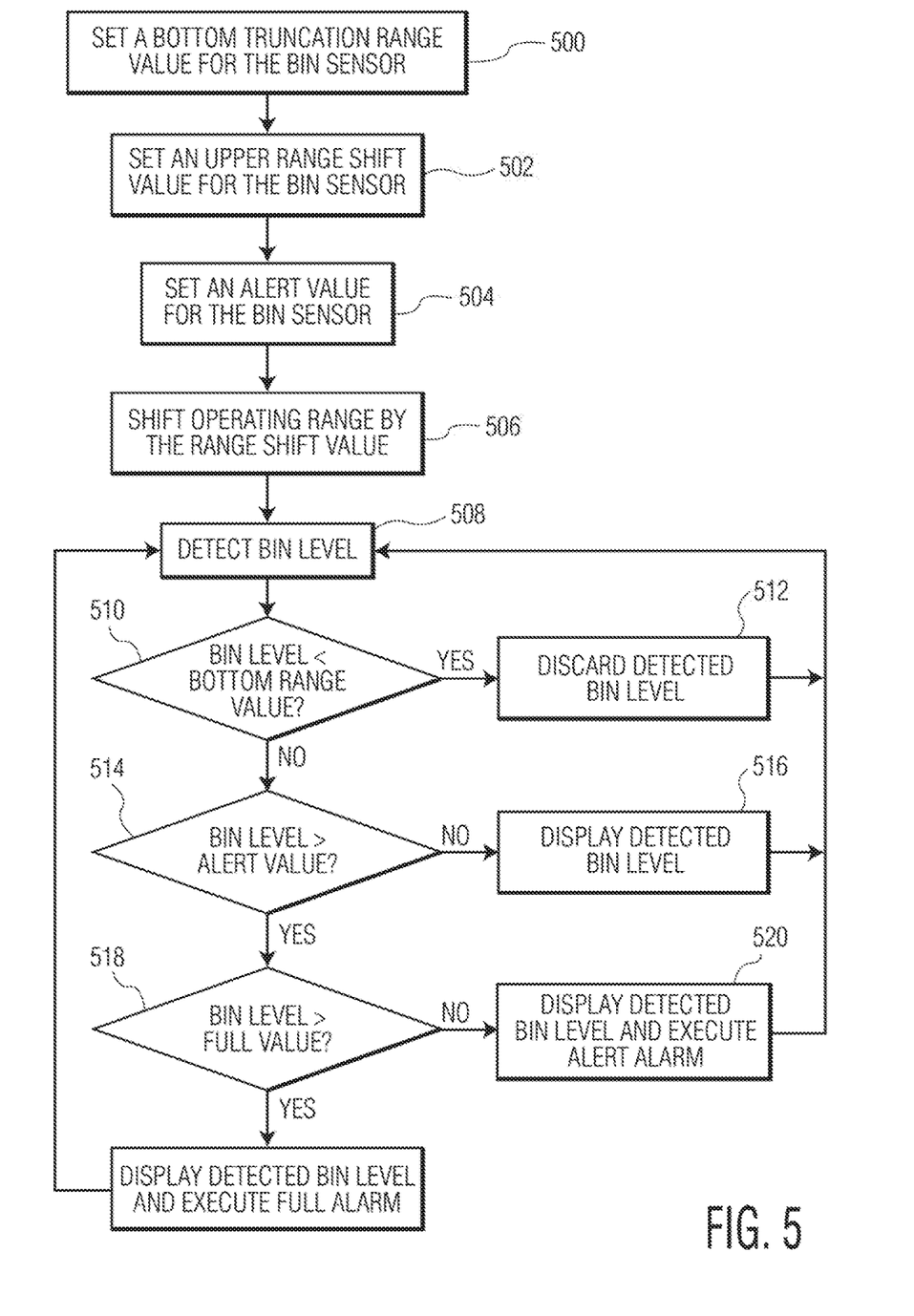
FIG. 5 is a flowchart for controlling the shifting of the operating range of the bin level sensor, according to an embodiment of the invention.

Operation of the combine is now described with respect to the flowchart in FIG. 5. In step 500, the controller sets a range of values for truncating the bottom of the sensor operating range which will not displayed during operation. In step 502, the controller sets a shift value for shifting the operating range of the sensor according to various factors including terrain. In step 504, the controller sets an alarm value for indicating when an alarm should be executed to alert the operator that the bin is almost full. In step 506, the controller shifts the operating range of the sensor by the shift value. In step 508, the sensor detects the bin level.

Then, in step 510, the controller compares the detected bin level to the bottom range value. If the detected bin level is less than the bottom range value, then in step 512, the detected bin level is discarded and not displayed to the operator. If, however, the detected bin level is not less than the bottom range value, then in step 514 the bin level is compared to the ALERT indicator. If the detected bin level is not greater than the alert value, then in step 516 the bin level is displayed to the operator. If, however, the bin level is greater than the alert value, then the bin level is compared to the full value in step 518. If the detected bin level is not greater than the full value, then in step 520 the bin level is displayed to the operator and the alert alarm is executed. If, however, the bin level is greater than the full value, then in step 522 the bin level is displayed to the operator and the full alarm is executed. The full alarm and the alert alarm may different from each other. In one example, the full alarm may be more substantial than the alert alarm. For example, the alert alarm may be a flashing light, whereas the full alarm may also include a loud buzzer. This is beneficial, because a more critical situation arises when the grain tank is completely full, as opposed to partially full.

It should be noted that the shift value, the alert value, and the truncated range may be selected by the operator based on the various factors described above. Alternatively, the controller may automatically select these values based on the factors described above. For example, the controller can analyze a topographical map of the terrain being harvested and track the combine path using GPS. The values may be initially set by the controller and then dynamically adjusted during harvesting.

The steps of setting the shifted operating range, the truncated operating range, and the alert/full indicators shown in steps 500-518 of FIG. 5 are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIG. 5, are implemented in software code or instructions which are tangibly stored on a tangible computer readable medium. Upon loading and executing such software code or instructions by the controller 310, the controller 310 may perform any of the functionality of the controller 310 described herein, including the steps shown in FIG. 5 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a feeder housing for receiving harvested crop;
   a threshing and separating system for threshing the harvested crop to separate grain from residue;
   a grain bin for storing the separated grain;
   a bin level sensor for detecting grain in the grain bin; and
   a controller that controls the combine, the controller configured to:
      generate a usable operating range by:
         setting, by the controller, an upper range value for the usable operating range, wherein the upper range value corresponds to a first fill level of the grain bin,
         setting, by the controller, a lower range value for the usable operating range, wherein the lower range value is greater than zero and corresponds to a second fill level of the grain bin that is less than the first fill level, and
         discarding values that are less than the lower range value,
      generate a shifted operating range by shifting the usable operating range by a shift value, such that:

the upper range value is shifted to correspond to a third fill level of the grain bin that is less than the first fill level by the shift value, and the lower range value corresponds to a fourth fill level of the grain bin that is less than the second fill level by the shift value, receive, from the bin level sensor, a first value indicating a detected fill level of grain in the grain bin, generate a second value by shifting the first value by the shift value, and present the second value to an operator of the combine when the second value is in the usable operating range.

2. The combine of claim 1,
wherein the controller is further configured to:
select the upper range value or lower range value based on accuracy of the sensor, or based on input received from the operator of the combine.

3. The combine of claim 1,
wherein the controller is further configured to:
ignore values received from the bin level sensor that are in the discarded values.

4. The combine of claim 1,
wherein the controller is further configured to:
display the usable operating range as a percentage range correlating to the detected fill level in the grain bin, a voltage range of the sensor correlating to the detected fill level in the grain bin, a distance range of the sensor correlating to the detected fill level in the grain bin, or a volume range correlating to the detected fill level in the grain bin.

5. The combine of claim 1,
wherein the controller is further configured to:
select the shift value based on terrain that the combine is traversing, speed of the combine, type of combine being operated, type of grain being harvested, or based on input from the operator of the combine.

6. The combine of claim 1,
wherein the controller is further configured to:
select the shift value based on grade of terrain that the combine is traversing.

7. The combine of claim 1,
wherein the controller is further configured to:
select the shift value to avoid spilling grain from the grain bin during harvesting or transportation.

8. The combine of claim 1,
wherein the controller is further configured to:
generate the shifted operating range by subtracting the shift value from the usable operating range,
generate the second value by subtracting the shift value from the first value.

9. The combine of claim 1,
wherein the controller is further configured to:
indicate the second value to an operator of the combine by displaying a percentage value correlating to the detected fill level in the grain bin, a voltage value of the sensor correlating to the detected fill level in the grain bin, a distance value of the sensor correlating to the detected fill level in the grain bin, or a volume value correlating to the detected fill level in the grain bin.

10. A method for controlling a combine including a chassis, a feeder housing for receiving harvested crop, a threshing and separating system for threshing the harvested crop to separate grain from residue, a grain bin for storing the separated grain, a bin level sensor for detecting grain in the grain bin, and a controller that controls the combine, the method comprising:
generating, by the controller, a usable operating range by:
setting, by the controller, an upper range value for the usable operating range, wherein the upper range value corresponds to a first fill level of the grain bin,
setting, by the controller, a lower range value for the usable operating range, wherein the lower range value is greater than zero and corresponds to a second fill level of the grain bin that is less than the first fill level, and
discarding values from an operating range of the bin level sensor;
generating, by the controller, a shifted operating range by shifting the usable operating range by a shift value such that:
the upper range value corresponds to a third fill level of the grain bin that is less than the first fill level by the shift value, and
the lower range value corresponds to a fourth fill level of the grain bin that is less than the second fill level by the shift value;
receiving, by the controller, from the bin level sensor, a first value indicating a detected fill level of grain in the grain bin;
generating, by the controller, a second value by shifting the first value by the shift value; and
presenting the second value to an operator of the combine when the second value is in the usable operating range.

11. The method of claim 10, further comprising:
selecting, by the controller, the upper range value or lower range value based on accuracy of the sensor, or based on input received from the operator of the combine.

12. The method of claim 10, further comprising:
ignoring, by the controller, values received from the bin level sensor that are in the discarded values.

13. The method of claim 10, further comprising:
displaying, by the controller, the usable operating range as a percentage range correlating to the detected fill level in the grain bin, a voltage range of the sensor correlating to the detected fill level in the grain bin, a distance range of the sensor correlating to the detected fill level in the grain bin, or a volume range correlating to the detected fill level in the grain bin.

14. The method of claim 10, further comprising:
selecting, by the controller, the shift value based on terrain that the combine is traversing, speed of the combine, type of combine being operated, type of grain being harvested, or based on input from the operator of the combine.

15. The method of claim 10, further comprising:
selecting, by the controller, the shift value based on grade of terrain that the combine is traversing.

16. The method of claim 10, further comprising:
selecting, by the controller, the shift value to avoid spilling grain from the grain bin during harvesting or transportation.

17. The method of claim 10, further comprising:
generating, by the controller, the shifted operating range by subtracting the shift value from the usable operating range, and
generating, by the controller, the second value by subtracting the shift value from the first value.

18. The method of claim 10, further comprising:
indicating, by the controller, the second value to an operator of the combine by displaying a percentage value correlating to the detected fill level in the grain bin, a voltage value of the sensor correlating to the detected fill level in the grain bin, a distance value of the sensor correlating to the detected fill level in the grain bin, or a volume value correlating to the detected fill level in the grain bin.

\* \* \* \* \*